Sept. 8, 1959  G. E. BARNHART  2,903,308
COMPOSITE CYLINDER
Filed March 3, 1955
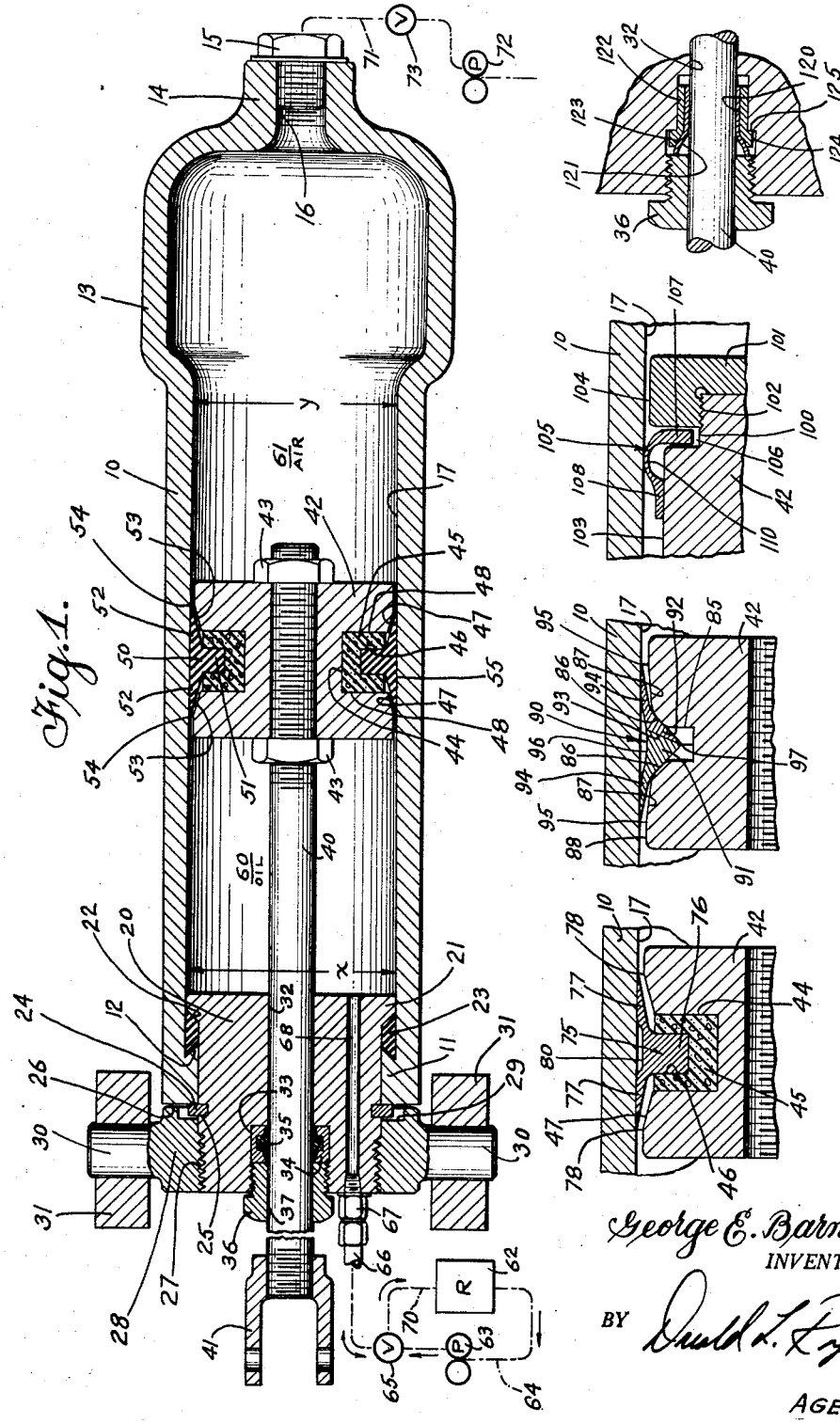
George E. Barnhart
INVENTOR.
BY David L. Pryor
AGENT United States Patent Office 2,903,308
Patented Sept. 8, 1959

2,903,308

COMPOSITE CYLINDER

George E. Barnhart, Altadena, Calif.

Application March 3, 1955, Serial No. 491,998

11 Claims. (Cl. 309—2)

The present invention relates generally to a composite cylinder construction and relates more specifically to a composite cylinder construction including as part of the combination thereof and to enable overall composite operational characteristics, a cylinder arrangement coupled with an end closure therefor, a support for the cylinder, a piston, sealing means for the piston, and an operational system associated with the entire device.

In cylinder constructions as, for example, those which may be used as shock absorbers, accumulators, actuators, a means for storing energy, or for any of the variety of purposes to which such arrangements may be placed, the various components thereof all cooperate to produce an end result which is, of course, the efficient, effective, and reliable performance of a certain function. In other words, in order that the ultimate effect may be gained from any particular cylinder or engine, it is necessary that the cylinder have the ability to perform in specific manners. For example, cylinders utilized for any of the beforementioned purposes must necessarily have inherently incorporated therein means by which a piston or other movable wall may move smoothly and efficiently within the cylinder; means for creating adequate sealing between the piston and the cylinder walls; means by which break-out of the piston relative to the cylinder walls may be efficiently effected; means for preventing any undesirable bending moments about the cylinder, such moments being in connection with a support for the cylinder; and an adequate and efficient system for use in the operation of the various components.

Heretofore, cylinder arrangements of the present type have provided for various of the beforementioned necessities; however, none of these prior devices have enabled composite operational characteristics efficiently to result in the desired final functional characteristics desired in such structures. Prior devices have enabled leakage between a piston and a cylinder wall, have required considerable force to effect initial movement or break-out of a piston, have been mounted or supported in such a manner as to bind upon an operating shaft and have otherwise been inefficient in operation. Additionally, when such cylinder constructions are used in connection with aircraft, missiles, or the like, it is important that the overall weight be maintained at a level which is as low as possible commensurate with efficient operation. Naturally, such low weight level may only be maintained when overall efficiency of a composite cylinder construction is retained at a high level.

Thus, while it is recognized that prior arrangements have provided for many of the individual features of the present arrangement, none of these arrangements may be combined to create a composite situation including features of novelty which all cooperate toward the desired end result.

Accordingly, it is the main and principal object of the present invention to provide a composite cylinder construction having features of novelty efficiently, effectively, and reliably to produce the desired end result as set forth hereinbefore.

Another important object of the present invention is to provide a novel cylinder construction for use with a piston or other movable wall arrangement as to enable efficient, smooth, easy, reliable operation thereof and low break-out forces.

A further important object of the present invention is to provide a novel composite cylinder construction including novel support therefor whereby to enable angular or other movement of the cylinder in a manner to prevent undesirable bending moments or binding effects upon operating mechanisms or components extending therefrom. A still further important object of the present invention is to provide a composite cylinder construction including novel sealing arrangements for use between a piston and a cylinder wall.

Another important object of the present invention is to provide a novel power storing composite cylinder construction including a combination of elements and a fluid system for enabling efficient operation, smooth running, anti-binding support and positive slidable sealing.

Still another important object of the present invention is to provide a novel means for effecting a positive seal betweeng a piston and a cylinder wall wherein molecular characteristics of a metallic sealing member are maintained within precise limits in order that deflection thereof may be accomplished without seizing or binding of the sealing arrangement relative to an adjacent surface.

Other and further important objects of the present invention will become apparent from the disclosures in the following detailed specification, appended claims, and accompanying drawing, wherein:

Fig. 1 is a longitudinal sectional view through the composite cylinder of the present invention;

Fig. 2 is an enlarged fragmentary sectional view showing another form of piston sealing arrangement;

Fig. 3 is a fragmentary sectional view showing a further type of piston sealing arrangement;

Fig. 4 is a fragmentary sectional view showing still another piston sealing arrangement; and Fig. 5 is a fragmentary sectional view showing another application of the piston sealing arrangement of Fig. 4.

With reference to the drawing the composite cylinder is shown as including an elongated cylindrical member 10. The cylindrical member 10 has an inwardly directed flange 11 formed on one end thereof with the inner side of the flange 11 being bevelled as at 12. The other end of the cylinder 10 is enlarged as at 13 and is provided with a reduced diameter axially disposed neck portion 14. A plug or the like 15 is shown as being disposed in a threaded opening 16 in the neck 14, however, the present cylinder may be attached as by any well-known type of fitting arrangement to adjacent conduits or other connections if so desired. While such an arrangement is difficult to illustrate in the drawings included herewith, it is to be noted that the inner diameter at one end of the cylinder, as shown by the dimension $x$ is slightly larger than the inner diameter at another end of the cylinder as shown by the dimension $y$, the purpose of which will be hereinafter more fully described. The cylindrical member 10 may be formed as by any suitable means such as for example, as by rolling, forging, cold working or the like in order that the particular configuration or any other desirable configuration may be obtained. It is preferable, however, that the inner working surface 17 of the cylindrical member be constructed in such a manner as to present a smooth, non-porous, and polished situation in order that the material of the cylinder may permanently retain pressure and that friction along the surface 17 may be maintained at a low level.

The end of the composite cylinder opposite from the plug or closure 15 is provided with a closure fitting 20, the inner end of which has an outwardly directed flange 21 which presents a bevelled surface 22 on one side thereof. The bevelled surface 12 on the cylindrical member 10 and the bevelled surface 22 on the closure 20 cooperate to retain a sealing ring 23 therebetween in order that the closure may be sealed relative to the interior of the cylindrical member. A snap ring 24 disposed in a groove 25 about the outer surface of the closure 20 is adapted for engagement with an end 26 of the cylindrical member to retain the closure member in position. The closure member 20 may be inserted into its position by any desired means such as, for example, prior to the formation of the flange 11 on the cylindrical member or forming of the end closure in the area of the neck 14.

As shown in Fig. 1, the closure member 20 extends beyond the end 26 of the cylindrical member 10 and is threaded as at 27. A support fitting 28 threadably engages the threads 27, and a pair of trunnion members 30 are depended radially outwardly therefrom. The trunnion members are adapted to be journalled in an adjacent supporting structure as indicated at 31. In this connection, it is to be understood that the particular trunnion construction is shown merely by way of example and that the fitting 28 may have attached thereto various types of support arrangements commensurate with the desired ultimate movement composite cylinder without departing from the spirit and scope of the present invention. It is further to be noted that the inner end of the fitting 28 is provided with a recess 29 that is adapted to encompass the snap ring 24 in order to prevent inadvertent movement or removal of the snap ring.

It may thus be seen that the composite cylinder of the present invention is supported from but one end thereof and by means of the closure member 20, there being no direct connection between the cylindrical member 10 and the support for the composite arrangement thus to prevent undesirable bending moments from being transmitted from the support to the cylindrical member. Such bending moments would naturally impart slight binding upon any device that may extend through the closure member and which may be equipped to run along the interior surface 17 of the cylindrical member 10. This combination therefore permits smoother and lower friction operation of the composite arrangement.

The closure member 20 has an axial bore 32 therethrough, the outer end of which is provided with a recess 33. The recess 33 is adapted for reception of an annular seal support member 34 in which is positioned a sealing member 35. This sealing member 35 may be of a special construction as to be hereinafter more fully described. The annular seal support 34 is retained in the recess 33 by means of a threaded fitting 36 that has an axial bore 37 therethrough.

An operating rod 40 is slidably positioned within the bore 32 in the closure member 20, the sealing member 35 and the bore 37 in the fitting 36. The outer end of the rod 40 has affixed thereto a fitting 41 which is shown being in the form of a clevis. However, it is to be understood that any type of fitting for a particular application may be utilized in place of this clevis.

The inner end of the rod 40 extends through and is attached to a piston indicated generally at 42 as by for example, a pair of nuts 43 that engage each side of the piston 42. As will be hereinafter more fully described, the piston 42 may assume a variety of shapes and the particular method of attaching the piston to the rod 40 is of no moment herein. As shown in the form of the invention of Fig. 1, the piston 42 is provided with a peripheral groove 44 in which is disposed a resilient material 45. The material 45 may be either rubber, plastic, soft metal, or the like and has a further peripheral groove 46 formed thereabout. The piston 42 is additionally provided with conical portions 47, the smaller ends thereof connecting with sides 48 of the piston groove 44. The piston 42 is also arranged in slight spaced relationship to the surface 17 of the cylindrical member 10 and has a diameter that is less than the diameter of the smaller end of the cylindrical surface 17 as indicated by the dimension $y$.

An annular sealing ring 50 is completely integral and provided with an inwardly directed centrally disposed flange 51 that is adapted for disposition in the groove 46 formed in the outer periphery of the resilient material 45. The ring 50 is also provided with axially directed conical portions 52 on each side thereof which present conical surfaces 53 that are disposed in spaced relationship to the conical surfaces 47 of the piston 42. The outer axial ends of the ring portions 52 terminate in sharp edges 54. The outer surface 55 of the ring 50 is generally cylindrical and of a diameter approximately equal to the diameter as indicated by the dimension $x$ at the large end of the cylindrical surface 17.

In the construction of the ring 50 and the various modifications thereof to be hereinafter more fully described, it is important to note that these rings have no axially directed splits or cut-away portions therein. The rings may be assembled about the piston 42 by any desired means such as for example, the split arrangements of the piston or by actually forming the rings thereabout. Furthermore, it is to be noted that the ring 50, and other rings to be hereinafter described must be compressed and be permitted to expand radially in order that they may provide a positive seal between the piston and the cylindrical member 10 along the entire reducing diameter of the surface 17. In order to accomplish this particular feature it is desirable that the metallic characteristics of the rings and the working thereof be maintained below the ultimate elastic limits of the metal and in such a manner that the radial compression thereof will be within limits that are also below such elastic limit.

Through use of the tapered internal surface 17 of the cylindrical member 10 it is to be noted that break-out may not easily be accomplished when the piston is being moved toward the left as viewed in Fig. 1. When the piston is moved in either direction along the cylindrical surface 17 the supporting of the ring 50 in the resilient material 45 by means of the flange 51 enables the ring slightly to transform in order that the outer surface 55 will be disposed at a very slight angle to the surface 17. Accordingly, such transformation of the ring 50 will cause the annular sharp ends 54 closely to conform to the surface 17 to provide a wiping or scraping action along the surface 17. Accordingly, if a chamber 60 defined between the piston 42 and the closure 20 is filled with oil, and a chamber 61 defined between the piston 42 and the closure in the area of the neck 14 is filled with air, a positive seal will be provided to provide the intermixing of the fluids between the chambers 60 and 61.

The enlarged portion 13 in the cylindrical member 10 may form an accumulator portion for air in the chamber 61. In the event that the present cylinder construction is utilized as a means for storing energy, oil or other liquid from a suitable reservoir 62 may be delivered to a pump 63 through a conduit 64 and from the pump 63 through a valve 65 by way of a conduit 66. The conduit 66 communicates with the chamber 60 by way of a fitting 67 and an elongated opening 68 through the closure member 20. By pumping the liquid into the chamber 60, the piston 42 will be moved to the right as viewed in Fig. 1 whereby to compress the air in the chamber 61. The air thus compressed serves as a stored source of energy so that upon changing of the position of the valve 65, which may be a diverter valve, the liquid in the chamber 60 will be permitted to flow outwardly through the opening 68 and conduit 66 to the reservoir 62 by way of a branch conduit 70. Simultaneously, the piston 47 will be moved leftward as viewed in Fig. 1 to move the rod 40 and fitting 41 in the same direction. The fitting 41 may be attached to any suitable mechanism to be operated.

Additionally, it is to be noted that the particular support arrangement defined by the closure member 20, fitting 28, and trunnions 30 enables the piston and the rod to be moved through the cylindrical member 10 and closure member 20 without undue binding thereof whereby to permit efficient, smooth and low friction operation of the present device.

In some instances, it may be desirable to provide the cylinder plug 15 with a connection with a conduit 71 which extends to a motor driven pump 72, there being a check valve 73 in the conduit 71. This arrangement will enable establishment of an initial pressure head in the chamber 61.

With reference to Fig. 2, the piston 42 may be equipped with a slightly different type of ring as indicated at 75. The ring 75 is carried by the suitable flexible material 45 which is disposed in the groove 44 with the flexible material being provided with the groove 46 for reception of a flange 76 on the ring 75. In this particular form of the invention it is to be noted that the ring 75 is provided with axially extending annular ring portions 77 that are relatively thin in longitudinal cross-section and are contoured in this connection with the flange 76. The axial ends of the portions 77 are defined by sharp annular edges 78 and the central area between the portions 77 has a slight groove 80 that is generally semi-circular or rectangular in cross-section. Thus, in this form of the ring, the axial portions of the ring are permitted greater spring action and deflection by reason of the more resilient portions 77. The particular type of ring shown in Fig. 2 may be employed in situations where it is desired to construct the ring member from harder material than would be employed in normal situations.

In Fig. 3 a further modified form of the invention is shown wherein the piston 42 is defined with an axially centrally disposed radially directed annular groove in the periphery thereof. The outer peripheral portions of the sides of the groove 85 are provided with conically formed surfaces 86 which thereafter are rounded and contoured as at 87 for merging with the outer surface 88 of the piston 42. In the particular form of the ring, as indicated at 90 utilized with this form of the invention, the ring is constructed with two components 91 and 92 that engage each other along an angularly disposed junction 93. This particular arrangement includes axial end portions 94 and sharp edges 95 that are similar to the form of the invention shown in Fig. 2 including the semi-circular groove 96. The two portions 91 and 92 of the ring 90 come together along their inner periphery at an apex 97 from which also extends the junction line 93. It may thus be seen, in this particular form of ring construction, that greater flexibility of the rings may be attained by movement thereof both along the conical surfaces 86 and against each other along the junction line 93 whereby to permit adequate sealing between the piston and the cylinder wall surface 17.

In Fig. 4 a still further modified form of the invention is shown wherein the piston 42 is provided with a reduced diameter end portion 100 that defines one side of the bottom of a groove. The other side of the groove is defined by an end portion 101 for the piston 42 that threadably engages the piston as at 102. It is to be noted that the outer surface 103 of the piston 42 is of a diameter less than the outer surface 104 of the end portion 101. The outer surfaces 103 and 104 are, however, each spaced from the cylindrical surface 17 of the cylindrical member 10. A sealing member 105 is positioned in association with the groove 106 defined between the piston and the member 101. This cylindrical member comprises a radially directed ring portion 107 that is adapted for loose disposition within the groove 106 and an axially directed annular portion 108 that is adapted for disposition on and direct engagement with the outer surface 103 of the piston 42. The portions 107 and 108 of the ring 105 are integrally connected together by means of a relatively thin portion 110 that is generally semi-circular in cross-section. The outer surface of the portion 110 is adapted for engagement with the surface 17 of the cylindrical member 10. It may thus be seen that with movement of the piston 42 in either direction within the cylinder 17, the ring 105 will be moved into either tight or loose engagement with the cylindrical surface depending upon the direction of movement of the piston and the tendency either to compress or elongate the semi-circular portion 110 of the ring. Naturally, in this particular form of the invention the ring 105 must be resilient with the metallic characteristics thereof being such as to place the cold worked nature of the material below the ultimate elastic limit thereof so that the ring will always assume a position in tight contact with the surface 17. In this connection, it is to be understood that the particular metallic characteristics of the ring 105 may further be established by heat treating or a combination of cold working and heat treating.

The form of the invention shown in Fig. 5 may be used as for example about the piston rod 40 in place of the seal 35 and forms a modification for this particular type of seal. As shown, the arrangement of Fig. 5 is similar in functional characteristics as the seal arrangement of Fig. 4. Basically this particular arrangement includes a sleeve 120 that has a semi-circular end portion 121. A second sleeve 122 is adapted to surround the sleeve 120 with a conical portion 123 being adapted for cooperation with an exterior service of the inner sleeve portion 121. The sleeve 122 has a flange 124 that is adapted for cooperation with a step 125 formed in one end of the bore 32. The sleeve 120 is cold worked or otherwise formed in such a manner as to render the molecular structure therein at a point that is below the elastic limit of the particular material. As the nut 36 is tightened, the portion 121 of the sleeve 120 will be forced against the conical portion 123 of the outer sleeve 122 thus to deform the sleeve 120 radially inwardly into engagement with the outer service of the piston rod 40. Thus, any desired frictional engagement may be had between this seal arrangement and the piston rod. By the particular forming process utilized with the sleeve 120, and the disposition of the metallic characteristics thereof below the elastic limit of the material, when the nut 36 is loosened, the sleeve 120 will again be loosened from about the rod 40 and no permanent deformation of the sleeve 120 will result.

Having thus described the invention and the present several embodiments thereof, it is desired to emphasize the fact that many modifications may be resorted to in a manner limited only by a just interpretation of the following claims.

I claim:

1. A supporting arrangement for a cylinder, wherein said cylinder includes an elongated cylindrical member, a piston reciprocally disposed in said cylinder, a closure member positioned in association with one end of said cylinder and a motion transmitting rod connected with said piston and slidably disposed outwardly through said closure member, comprising: an extending portion associated with said closure member and disposed beyond confines of said one end of said cylindrical member; and means carried by and disposed laterally from said extending portion for attaching said closure member and said cylinder to an adjacent structure thereby to support said cylinder.

2. A supporting arrangement for a cylinder, wherein said cylinder includes an elongated cylindrical member, a piston reciprocally disposed in said cylinder, a closure member positioned in association with one end of said cylinder and a motion transmitting rod connected with said piston and slidably disposed outwardly through said closure member, comprising: an extending portion associated with said closure member and disposed beyond confines of said one end of said cylindrical member; and trunnion means carried by said extending portion for attaching said closure member and said cylinder to an adjacent structure thereby pivotally to support said cylinder at one end only.

3. A supporting arrangement for a cylinder, wherein said cylinder includes an elongated cylindrical member, a piston reciprocally disposed in said cylinder, a closure member positioned in association with one end of said cylinder and a motion transmitting rod connected with said piston and slidably disposed outwardly through said closure member, comprising: an extending portion associated with said closure member and disposed beyond confines of said one end of said cylindrical member; trunnion means carried by said extending portion for attaching said closure member and said cylinder to an adjacent structure thereby pivotally to support said cylinder at one end only; and fluid control means connected to said extending portion whereby to permit unattached free movement of said cylinder about said trunnion means.

4. In a composite cylinder construction, the combination of: an elongated cylinder member; a closure positioned in association with one end of said cylinder; means for retaining said closure in position; means for permitting pressure tap attachment to the other end of said cylinder member; a piston disposed for slidable movement in said cylinder member; a motion transmitting member operatively connected with said piston and disposed through said closure; and an enlarged accumulator portion having a wall thickness substantially equal to a wall thickness of and formed integrally on said cylinder member adjacent said other end thereof.

5. In a composite cylinder including closure means for at least one end thereof and a piston reciprocally positioned therein, a cylinder member comprising: an elongated tube having an inner surface, said inner surface being adapted for contact by said piston; means for operatively associating said closure means with said tube; and integral means for providing increased volume in said tube adjacent at least one end thereof.

6. In a composite cylinder including closure means for one end thereof and a piston reciprocally positioned therein, a cylinder member comprising: an elongated annular tube having an axially directed inner diameter surface; an integral end portion adapted substantially to close one end of said tube; means for retaining said closure means in the other end of said tube; and an integral increased diameter portion adjacent said integral end portion for providing an accumulator of increased volume in said tube adjacent said one end of said tube.

7. In a cylinder construction having an elongated cylindrical member and a closure disposed in one end of said cylinder, means for retaining said closure in permanent connection with said cylinder comprising: a radially outwardly directed flange on an inner end of said closure; a radially inwardly directed flange on an end of said cylinder, said closure flange having an axial end and an outer diameter in excess of an inner diameter of said cylinder flange, said outer diameter being substantially equal to an inner diameter of said cylindrical member, said cylinder flange also having an axial end, and a seal disposed between said axial ends of said flanges.

8. A cylinder construction according to claim 7 wherein said axial ends of said flanges are radially outwardly divergently beveled.

9. A cylinder construction according to claim 7 wherein said closure has a shank portion and said inner diameter of said cylinder flange is disposed in intimate contact with said shank portion.

10. In a cylinder construction having an elongated cylindrical member and a closure disposed in one end of said cylinder, means for retaining said closure in permanent connection with said cylinder comprising: a radially outwardly directed flange on an inner end of said closure; a radially inwardly directed flange on an end of said cylinder, said closure flange having an axial end and an outer diameter in excess of an inner diameter of said cylinder flange, said cylinder flange also having an axial end, said axial ends on said closure and cylinder flanges being outwardly divergently bevelled; and a seal disposed between axial ends of said flanges.

11. In a cylinder construction having an elongated cylindrical member and a closure disposed in one end of said cylinder, means for retaining said closure in permanent connection with said cylinder comprising: a radially outwardly directed flange on an inner end of said closure; and a radially inwardly directed flange on an end of said cylinder, said closure flange having an axial end and an outer diameter in excess of an inner diameter of said cylinder flange, said outer diameter being substantially equal to an inner diameter of said cylindrical member.

References Cited in the file of this patent

UNITED STATES PATENTS

| 1,379,041 | Pulliam | May 24, 1921 |
| 2,145,384 | Allin | Jan. 31, 1939 |
| 2,209,032 | Mott | July 23, 1940 |
| 2,403,020 | Parsons | July 2, 1946 |
| 2,414,492 | Urschel et al. | Jan. 21, 1947 |
| 2,424,800 | Coverley et al. | July 29, 1947 |
| 2,448,266 | Kaser | Aug. 31, 1948 |
| 2,487,512 | Berger | Nov. 8, 1949 |
| 2,502,290 | Szitar | Mar. 28, 1950 |
| 2,520,306 | Detweiler | Aug. 29, 1950 |
| 2,574,273 | McLeod | Nov. 6, 1951 |
| 2,660,493 | Flick | Nov. 24, 1953 |